(12) United States Patent
Clarke

(10) Patent No.: US 12,727,556 B2
(45) Date of Patent: Sep. 8, 2026

(54) SUB-SURFACE SOIL IRRIGATION

(71) Applicant: IRROVATE (PTY) LTD, Greyton (CA)

(72) Inventor: Richard Enslin Clarke, Greyton (CA)

(73) Assignee: Irrovate (PTY) Ltd, Greyton (ZA)

( * ) Notice: Subject to any disclaimer, the term of this patent is extended or adjusted under 35 U.S.C. 154(b) by 389 days.

(21) Appl. No.: 17/801,827

(22) PCT Filed: Aug. 16, 2021

(86) PCT No.: PCT/IB2021/057522
§ 371 (c)(1),
(2) Date: Aug. 24, 2022

(87) PCT Pub. No.: WO2022/034563
PCT Pub. Date: Feb. 17, 2022

(65) Prior Publication Data

US 2023/0086006 A1 Mar. 23, 2023

(30) Foreign Application Priority Data

Aug. 14, 2020 (ZA) ................................ 2020/00952

(51) Int. Cl.
*A01G 25/00* (2006.01)
*A01C 23/04* (2006.01)
*A01G 25/02* (2006.01)
*A01G 29/00* (2006.01)

(52) U.S. Cl.
CPC ............ *A01G 29/00* (2013.01); *A01C 23/042* (2013.01); *A01G 25/02* (2013.01)

(58) Field of Classification Search
CPC ...... A01G 29/00; A01G 25/02; A01G 25/023; A01C 23/042; Y02A 40/22
See application file for complete search history.

(56) References Cited

U.S. PATENT DOCUMENTS 419,242 A * 1/1890 Brown .................. A01G 29/00 405/39
588,278 A * 8/1897 Kling .................... A01G 29/00 47/48.5
790,910 A * 5/1905 McClintock ............. E02D 7/30 405/253

(Continued)

FOREIGN PATENT DOCUMENTS

CN 211458009 U 9/2020
DE 10146016 A1 4/2003

(Continued)

OTHER PUBLICATIONS

Int'l Search Report for PCT/IB2021/057522, dated Nov. 17, 2021.
Supplementary European Search Report issued in corresponding European Patent Appln. No. 21855741, dated Feb. 9, 2024.

*Primary Examiner* — Edwin J Toledo-Duran
(74) *Attorney, Agent, or Firm* — MaxGoLaw PLLC

(57) ABSTRACT

Irrigation apparatus (70) is provided that includes an elongate housing (10) with an internal cavity (14) and a dispenser (24,76) that is fitted at a top of the cavity (14). The housing (10) is installed in soil and the dispenser (24,76) is supplied with water, which is dispensed into the cavity (14), to drip to an exposed soil surface (104) at the bottom of the housing (10), to provide water to plants.

12 Claims, 7 Drawing Sheets

(56) References Cited

U.S. PATENT DOCUMENTS 2,631,584 A * 3/1953 Purificato ............ A61B 17/746 606/68
3,303,800 A * 2/1967 Young ................ A01M 17/002 239/533.13
3,333,773 A * 8/1967 Hutchinson ............ B05B 1/262 239/18
3,460,562 A * 8/1969 Moulder ................ E03C 1/046 137/268
3,755,966 A * 9/1973 Smith .................... A01G 29/00 47/48.5
3,821,863 A * 7/1974 Chan ...................... A01C 21/00 47/48.5
3,916,564 A * 11/1975 Crowell, Sr. .......... A01C 21/00 175/23
4,031,915 A 6/1977 McElhoe et al.
4,153,380 A * 5/1979 Hartman ................ A01G 25/06 405/39
4,156,396 A 5/1979 Konucik
4,361,983 A * 12/1982 Wilson ................... A01G 25/00 47/9
4,697,952 A * 10/1987 Maddock ............... A01G 25/06 405/36
4,726,143 A * 2/1988 Steinbeck ............. A01G 29/00 47/48.5
4,753,394 A * 6/1988 Goodman ............ A01G 25/023 137/430
5,024,555 A 6/1991 York
5,102,259 A 4/1992 York et al.
5,443,641 A * 8/1995 Helsing .................. B27K 3/105 427/440
5,694,716 A * 12/1997 Bible ..................... A01G 29/00 175/23
5,761,846 A * 6/1998 Marz ...................... A01G 25/06 47/48.5
5,795,100 A * 8/1998 Thomas ................. A01G 25/06 405/36
5,975,797 A * 11/1999 Thomas ................. A01G 25/06 405/36
5,996,279 A * 12/1999 Zayeratabat ........... A01G 29/00 47/48.5
6,540,436 B2 * 4/2003 Ogi ........................ A01G 29/00 239/201
7,707,770 B2 * 5/2010 Liu ........................ A01G 25/06 405/36
8,065,832 B2 * 11/2011 King ...................... A01G 29/00 47/79
8,533,995 B1 * 9/2013 Behbehani ........... A01G 27/006 47/79
9,055,718 B2 * 6/2015 Geerligs ................ A01G 29/00
9,591,813 B2 * 3/2017 Wang ..................... A01G 29/00
10,081,922 B1 * 9/2018 Tsai ........................ E03F 1/002
2004/0108391 A1 * 6/2004 Onofrio .................. B05B 3/003 239/201
2005/0163569 A1 * 7/2005 Allen ..................... A01G 29/00 239/201
2005/0274071 A1 * 12/2005 Allen ..................... A01G 29/00 47/48.5
2008/0025796 A1 * 1/2008 Allen ..................... A01G 29/00 405/45
2009/0031626 A1 * 2/2009 Peterson ................ A01G 29/00 47/48.5
2010/0200676 A1 * 8/2010 Allen ................... A01G 25/023 239/542
2010/0212764 A1 * 8/2010 Grizzle ............... B01F 35/8311 137/896
2011/0056128 A1 * 3/2011 King ...................... A01G 29/00 47/48.5
2011/0162745 A1 * 7/2011 Grizzle ............... B01F 35/8311 137/896
2013/0219786 A1 * 8/2013 Geerligs ................ A01G 29/00 47/48.5
2017/0347544 A1 12/2017 Alfawaz et al.

FOREIGN PATENT DOCUMENTS

EP 0305622 A1 3/1989
KR 20100080686 A 7/2010
WO 20200193013 A1 1/2020

* cited by examiner

SUB-SURFACE SOIL IRRIGATION

FIELD OF THE INVENTION

This invention relates to irrigation, for wetting soil in which plants are cultivated. The irrigation apparatus and methods of the invention, are particularly suited for irrigating trees and vines, but are also suitable for other plants.

BACKGROUND TO THE INVENTION

Conventional above ground irrigation systems for trees and vines often use sprinkler systems in which each sprinkler sprays water to cover a designated area. Such a system typically wets the plants almost in their entirety, including their foliage-which causes problems associated with spray irrigation, such as mildew, sun damage to the leaves etc. Spray irrigation systems are also prone to being damaged by tractors, crop or tree spraying systems moving between the trees or vines, mowers, human traffic etc. Being above ground, the irrigation systems are also typically exposed to damaging UV radiation.

A more recently developed alternative form of above ground irrigation is micro-jet spraying, in which micro-jets spray smaller quantities of water close to the ground-typically close the bases of trees or vines. This system delivers the water more accurately to the bases of trees or vines with the advantages over sprinkler irrigation, of less waste and better control over the volume of water being delivered.

Water dispensed from the above mentioned irrigation systems is exposed to evaporation and wet the surface soil surrounding the trees or vines. The wet surface soil leads to unwanted growth of weeds and the like at the soil surface surrounding the trees and vines. The water lost to weeds and to evaporation have the combined result that only a fraction of the irrigated water is available to be absorbed by the root systems of the trees or vines. Depending on circumstances such as soil conditions, topography, and weather, these losses could be as high as 60% of the irrigated water.

To combat these shortcomings of above ground irrigation, a number of different sub-surface irrigation systems have been developed and in the main, these ultimately fail or become less efficient over time, for a number of reasons. The dominant design feature of most subsoil irrigation systems comprises of perforated piping that is laid in a trench that is usually dug prior to the trees or vines being planted. In some instances pipes are of solid construction with spaced apart perforations, while in other cases the pipes themselves are of a heavily perforated, almost sieve-like construction. In more unusual versions of this technique, other perforated structures are used, such as webs extending from flow channels. In some embodiments, the perforations are specifically spaced (e.g. every 2 meters) and the trees or vines are then planted with the same spacing, so that the roots of the newly planted tree or vine are situated above the interspersed perforations in the pipe.

The problem with these subsoil irrigation systems is that the perforations are highly prone to becoming blocked at some stage-typically either due to soil or roots closing the perforation/s in the pipe, but also possibly due to impurities supplied along with the water (e.g. scaling). There is also no way of checking which section of such an installed sub-soil irrigation system has blocked perforations and to investigate a suspected leak or blockage, the tree or vine would need to be disturbed-which typically results in substantial loss of manpower and/or damages. Also, because it is difficult to detect these blockages the trees and vines are invariably damaged by the time any blockages are rectified. This system of piping being laid is usually only possible with newly planted trees and vines where the pipes are positioned beneath the trees and vines, before planting the trees or fines. These irrigation systems are also wasteful of water and growth additives, because growth additives are surface delivered and the control of sub-surface pests such as cut worm, are difficult and costly.

Another irrigation system that is currently in use, is to enclose the irrigated area, e.g. by placing in inverted container (such as a waste bin with a hole cut in its bottom) around the stem of a tree. This is typically done by providing a slit in a side of the container so that it can be opened up and folded closed around the stem of the tree. The tree is then irrigated underneath the container, which serves to contain the surface water, inhibit evaporation, and exclude direct sunlight. However, this method still waters the surface soil and not the root system, it relies on soil conditions to allow for proper water penetration towards the root system, and it supplies water to unwanted surface growth such as weeds etc. It also does not allow for direct feeding of the root system with growth inducing fertilizers, pest control chemicals, or the like.

The present invention seeks to provide irrigation that avoids or at least substantially ameliorates the shortfalls of existing irrigation systems, as mentioned above.

SUMMARY OF THE INVENTION

According to a first aspect of the present invention there is provided irrigation apparatus comprising:

an elongate housing comprising an outer wall defining a receiving opening, a discharge opening and an elongate housing cavity that extends between the receiving opening and the discharge opening; and a dispenser that is attachable to the housing at the receiving opening, said dispenser being shaped and dimensioned to fit at least partly inside the housing cavity, and said dispenser defining an inlet opening that is connectable to a water supply conduit and an outlet opening that is in communication with the inlet opening and with the housing cavity, said outlet opening being spaced from the discharge opening of the housing when the dispenser is attached to the housing at the receiving opening.

The irrigation apparatus may include a drip emitter that is in flow communication with the inlet opening of the dispenser, e.g. the drip emitter could be connectable to the supply conduit, could take the form of a nozzle, or the like.

The dispenser may include at least one spreader element disposed at the outlet opening, said spreader element being configured to spread water discharged from the outlet opening, in the housing cavity. The spreader element may include at least one wall element disposed in a flow path extending between the outlet opening and the housing cavity.

The housing may include a housing stop formation that extends outwardly from the outer wall of the housing, e.g. the housing stop formation may be a circumferential housing flange.

Likewise, the dispenser may include a dispenser stop formation that is shaped and configured to engage the housing in the vicinity of the receiving opening, to hold the dispenser in an operational position, and to prevent the dispenser from entering the housing cavity beyond a predetermined depth, e.g. the dispenser stop formation may be a circumferential dispenser flange that is larger than the receiving opening of the housing.

The irrigation apparatus may include an additive dispenser that is in flow communication with the inlet opening of the dispenser.

The dispenser may includes an external wall that is at least partly permeable and that surrounds a reservoir cavity at least in part, said permeable wall defining a plurality of the outlet openings. The irrigation apparatus may further include at least one spacer that is disposed between the outer wall of the housing and the external wall of the reservoir.

According to another aspect of the present invention, there is provided an irrigation installation comprising the irrigation apparatus as described herein above, wherein the housing is disposed in soil with the receiving opening facing upwards and the discharge opening facing downwards, with the dispenser disposed at least partly inside the housing cavity.

BRIEF DESCRIPTION OF THE DRAWINGS

For a better understanding of the present invention, and to show how it may be carried into effect, the invention will now be described by way of non-limiting example, with reference to the accompanying drawings in which.

DETAILED DESCRIPTION OF THE DRAWINGS

Figure 1:
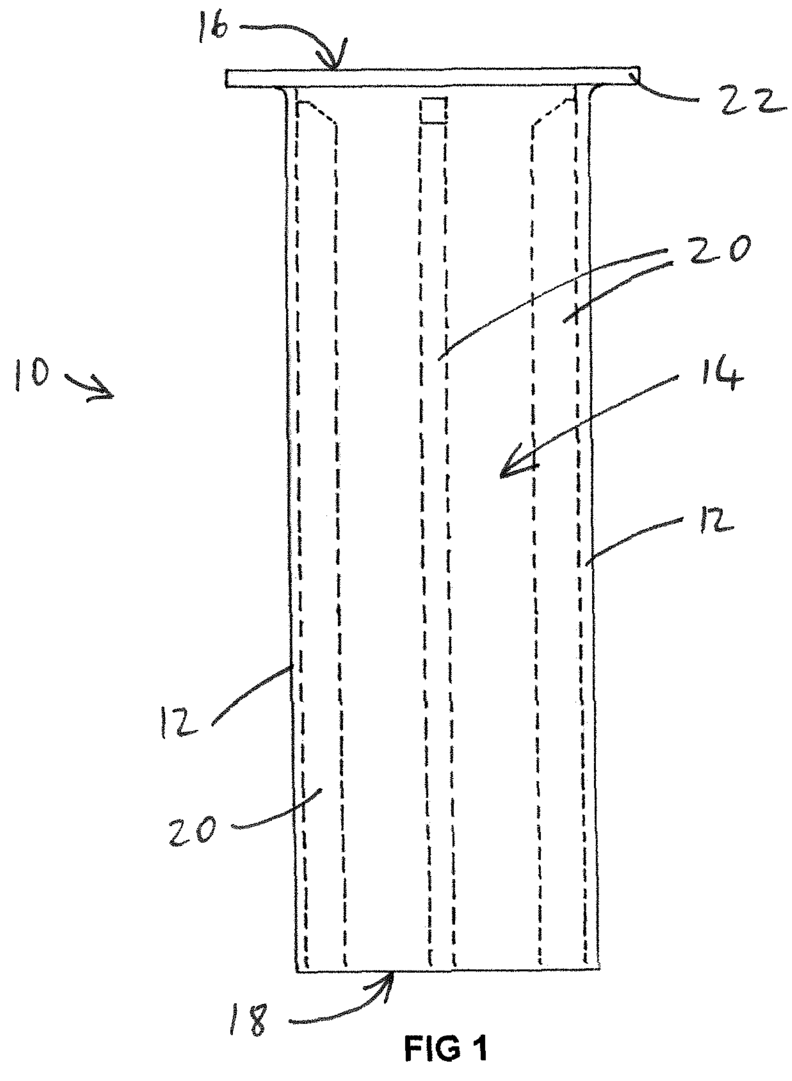
FIG. 1 shows a side view of a housing of a first embodiment of irrigation apparatus according to the present invention.
Figure 2:
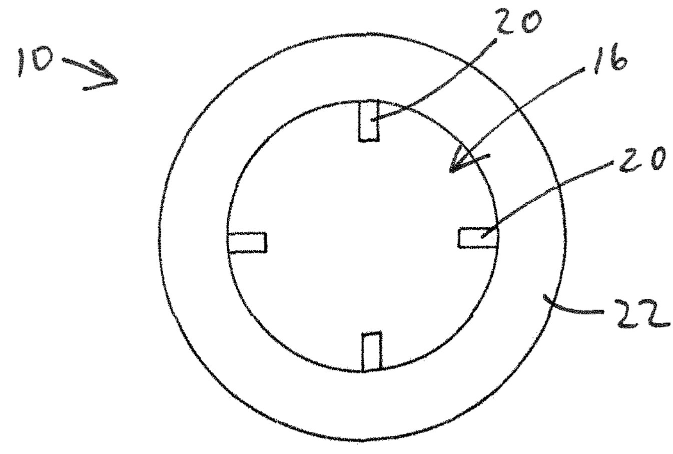
FIG. 2 shows a top view of the housing of FIG. 1.

Referring to FIGS. 1 and 2, a first illustrated embodiment of irrigation apparatus according to the present invention includes a housing 10 and in this embodiment, the housing is in the form of an elongated cylinder with a cylindrical outer wall 12 that extends around an internal housing cavity 14, with a receiving opening 16 at the top of the housing and a discharge opening 18 at the bottom of the housing, when the housing is in an upright, operational orientation. The receiving opening 16 and discharge opening 18 are in communication with the housing cavity 14, i.e. they are open to the housing cavity. The cylindrical shape of the housing 10 holds various advantages (which will be described in more detail below), but in other embodiments of the invention, a housing could be used with a different cross-sectional profile.

The housing 10 includes spacers in the form of four radial ribs 20 that extend longitudinally along the inside of the outer wall 12, into the housing cavity 14.

At the top of the housing 10, a housing stop formation in the form of a radial flange 22 extends outwards from the circumference of the receiving opening 16. When the housing 10 is installed, it is typically in soil and the flange 22 extends above the soil, or is buried slightly, so that the flange prevents the housing from sliding deeper into the soil. In other embodiments, the function of the flange could be performed by other protuberances that extend from the upper end of the housing 10, i.e. from the proximity of the receiving opening 16.

In other embodiments of the invention, the housing 10 could include housing stop formations in the forms of protuberances such as ribs on the outside of the outer wall 12—preferably in an upper region of the housing, to resist unwanted rotation of the housing when it is installed in soil.

Figure 3:
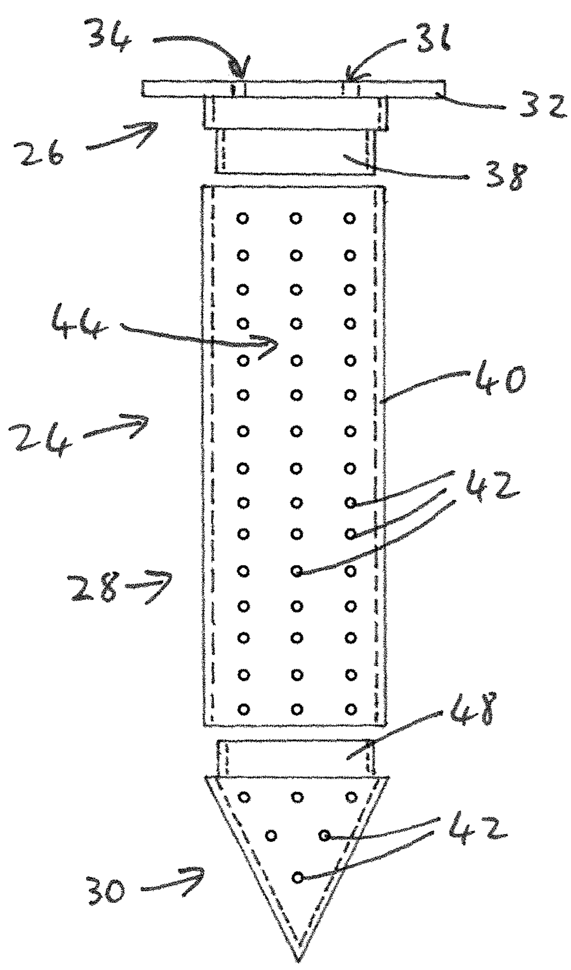
FIG. 3 shows and exploded side view of a reservoir of the first embodiment of irrigation apparatus according to the present invention.
Figure 4:
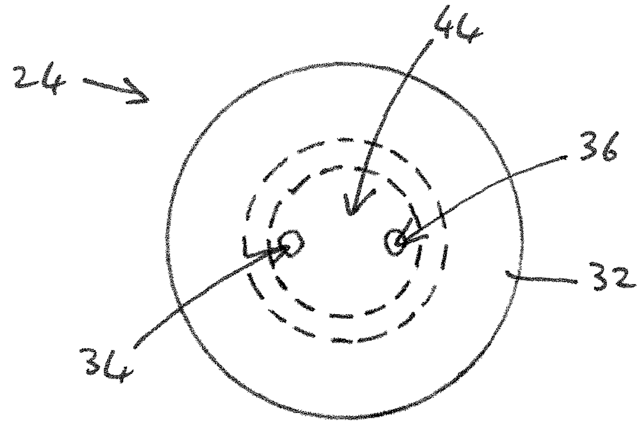
FIG. 4 shows a top view of the reservoir of FIG. 3.

Referring to FIGS. 3 and 4, the first illustrated embodiment of irrigation apparatus according to the present invention includes a dispenser in the form of a reservoir 24. The reservoir 24 could be a unitary component or could be assembled from multiple components and in this embodiment, the reservoir comprises of three parts: a top 26, a cylinder 28 and a bottom 30, which are attached together by friction, screw-thread, adhesive, or the like.

The top 26 of the reservoir 24 includes a dispenser stop formation in the form of a radial flange 32 with a circumference that is larger than the circumference of the receiving opening 16 of the housing 10. A central part of the flange 32 forms a wall and two apertures are defined in the wall and are identified in the drawings by reference numbers 34 and 36. (In other embodiments of the invention, there may be more apertures defined in the flange 32, or elsewhere.) Below the flange 32, the top 26 forms a hollow cylindrical spigot 38 that is receivable in the top of the cylinder 28.

The cylinder 28 is hollow, with a cylindrical external wall 40 that is permeable by virtue of defining multiple outlet openings 42. On the inside of the cylinder 29 there is a hollow reservoir cavity 44 that is in communication with the outlet openings 42.

The bottom 30 is hollow with a conical outer wall 46 that is perforated with outlet openings 42 and at the top of the conical outer wall, there is an upstanding spigot 48 that is receivable inside a bottom opening of the cylinder 28.

When the reservoir 24 is assembled, with the spigots 38,48 received and attached in the ends of the cylinder 28, the reservoir cavity 44 is surrounded by walls 32,40,46 of the reservoir, but the reservoir cavity is in communication with the apertures 34,36 in the flange 32 and is in communication with the outlet openings 42 in the cylinder 28 and bottom 30.

The reservoir 24 is shaped and dimensioned so that it fits partly inside the housing cavity 14—preferably with a little play between inner edges of the ribs 20 and the outer circumference of the cylinder 28. When the reservoir 24 is received in an operational position partly inside the housing cavity 14, the flange 32 of the reservoir extends above the flange 22 of the housing, so that the flange 32 of the reservoir serves as a stop formation and holds the reservoir in its operational position by preventing it from sliding further into the housing.

In other embodiments, the irrigation apparatus may include different stop formations, which may form part of the reservoir 24 or of the housing 10, e.g. the ribs 20 may include inward protuberances at their lower ends, which are engaged by the bottom 30 to prevent the reservoir from moving further downwards inside the housing.

The ribs 20 hold the wall 12 of the housing 10 and the wall 40 of the reservoir 24, apart, to provide an annular cavity between these cylindrical walls, but in other embodiments of the invention, different spacers could be used, e.g. spacers that extend from the outer circumference of the reservoir, or a separate spacer element.

The cylindrical shape of the housing 10 allows it to be inserted in holes provided in soil with a punch or auger. It would be possible to create differently shaped holes in the soil in which a non-cylindrical housing is receivable and/or the cylindrical housing 10 could be fitted in a non-round hole. However, it is preferable that the housing 10 fits inside the hole without excessive play and it is preferable that both the housing and the hole in which is it fitted, should be cylindrical.

The reservoir 24 is similarly also shown with a cylindrical shape, which has advantages such as fitting inside the ribs 20 with any orientation about a vertical cylinder axis. However, the reservoir 24 can have any shape and need not even be surrounded by a perforated wall 40,46, but could instead have a different water permeable wall, such as a mesh wall. Also, the reservoir cavity 44 can be completely hollow, but could in some embodiments include a permeable substance (e.g. to retain some water in the substance for slow release).

The housing 10 and reservoir 24 are preferably made of durable, firm materials, such as hard polymers, but they could be made of any suitably durable material that is cost effective enough. In a preferred embodiment, the housing 10 and reservoir 24 are made from recycled plastics materials.

Figure 5:
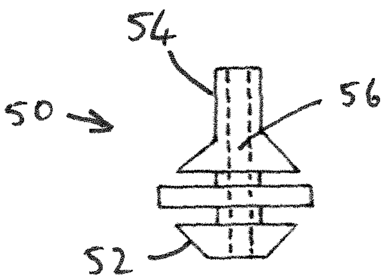
FIG. 5 shows a side view of a nozzle of the first embodiment of irrigation apparatus according to the present invention.

Referring to FIG. 5, the first illustrated embodiment of irrigation apparatus according to the present invention includes a drip emitter in the form of a nozzle 50 that is receivable on one of the apertures 34,36 by passing a flexible, conical nib 52 through one of the apertures in the flange-said aperture serving as an inlet opening of the reservoir. The nozzle 50 includes a hollow spigot 54 that is opposite from the nib 52 and that can be connected to a water supply by being received inside conventional irrigation tubing with a press fit. Inside the nozzle 50, there is a hollow bore 56 that serves as a nozzle aperture that is in flow communication between the water supply and the reservoir cavity 44.

Figure 6:
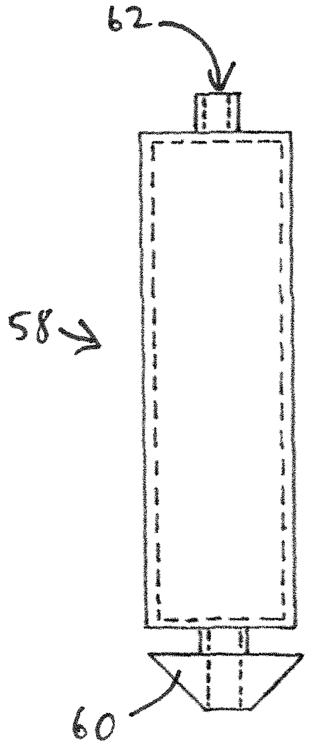
FIG. 6 shows a side view of a standpipe of the irrigation apparatus according to the present invention
Figure 7:
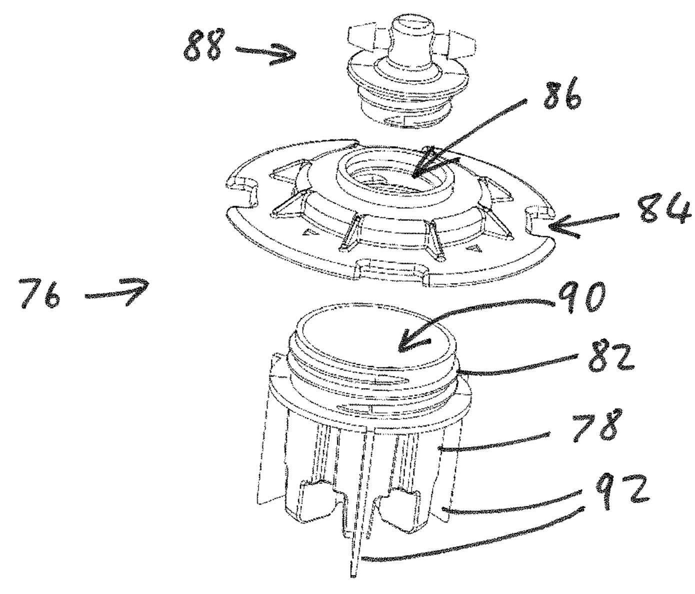
FIG. 7 shows a three-dimensional exploded view of a dripper assembly of a second embodiment of irrigation apparatus according to the present invention.
Figure 8:
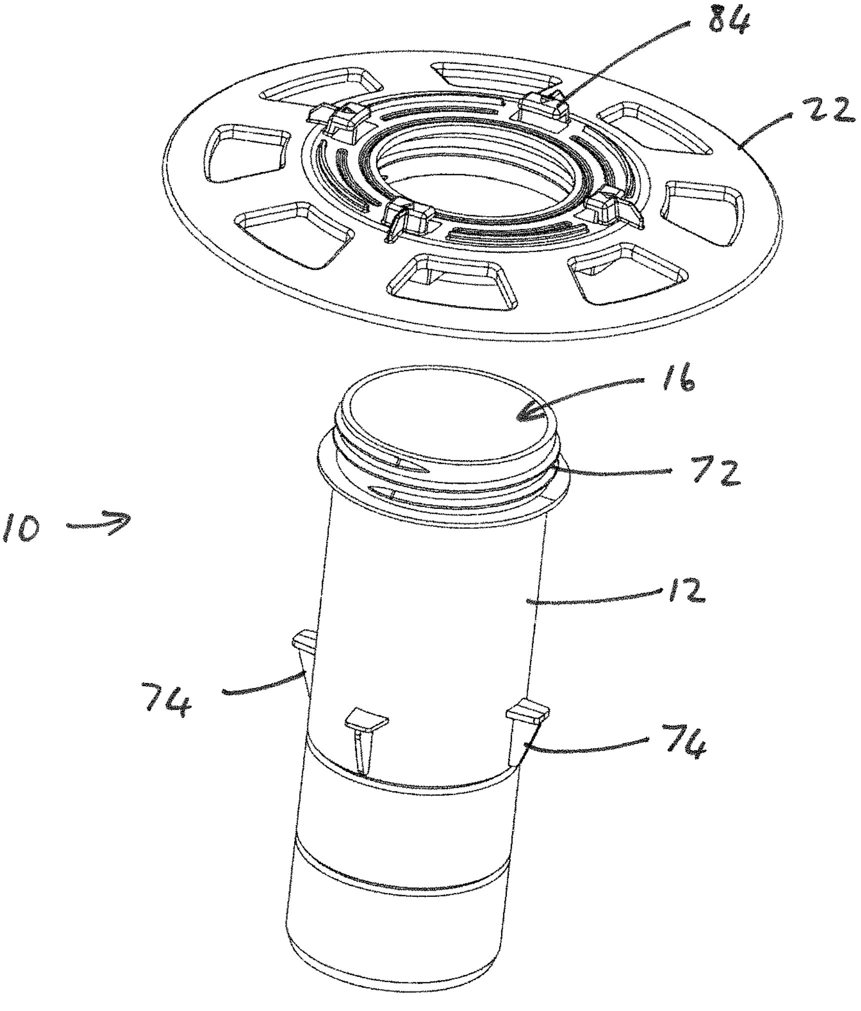
FIG. 8 shows a three-dimensional exploded view of a housing assembly of the second embodiment of irrigation apparatus according to the present invention.
Figure 9:
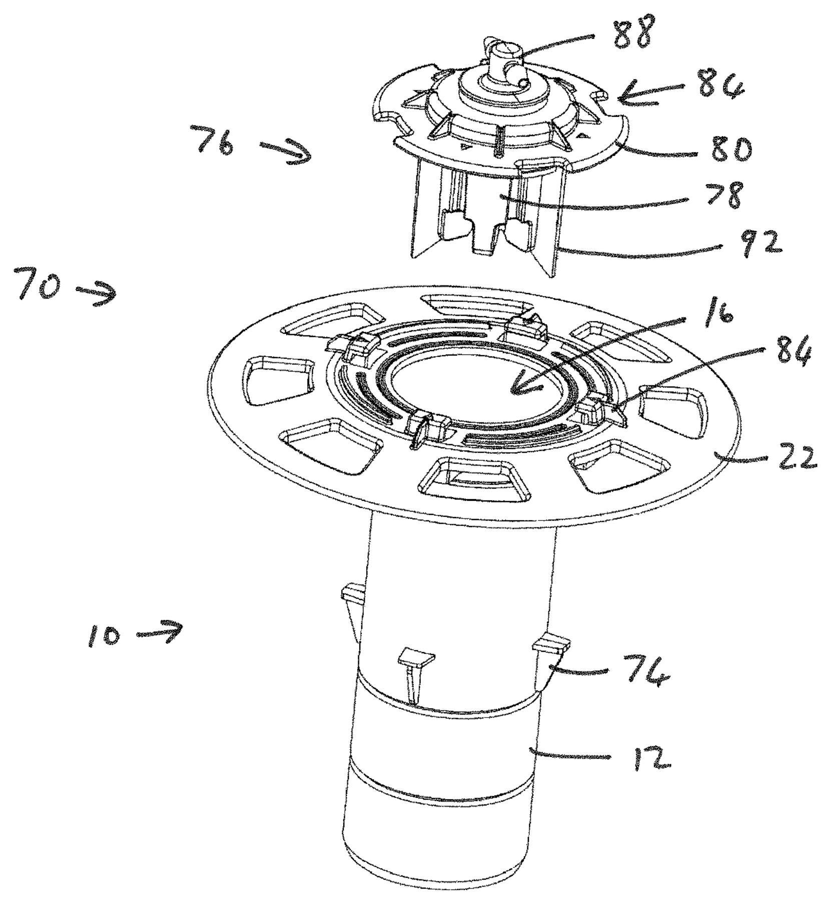
FIG. 9 shows a three-dimensional exploded view of the second embodiment of irrigation apparatus according to the present invention.
Figure 10:
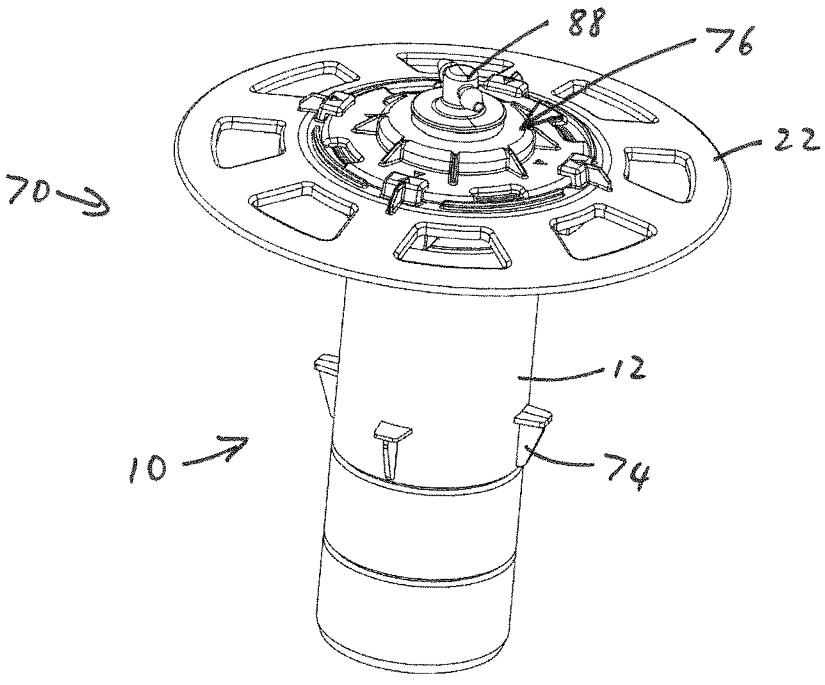
FIG. 10 shows a three-dimensional assembled view of the irrigation apparatus according of FIG. 9.

Referring to FIG. 6, the first illustrated embodiment of irrigation apparatus according to the present invention includes a standpipe 58 that is connectable to the second of the apertures 34,36 in the flange 32 with a conical nib 60, so that a flow passage inside the standpipe is in flow communication with the reservoir cavity 44 and extends upwards for any desired height, with a upper opening 62 of the flow passage at a higher elevation than the reservoir's flange 32. The standpipe 58 could be any upstanding conduit and it is not restricted to the geometry of a "pipe".

Referring to all of FIGS. 1 to 6, to install the first illustrated embodiment of irrigation apparatus according to the present invention, a suitably sized and shaped hole is dug or punched in soil at a location where irrigation is required, e.g. in the vicinity of the base of a tree or vine. The housing 10 is pushed down into the hole until it is in an operational position, with the flange 22 extending just above the top of the hole and the receiving opening 16 facing upwards and the discharge opening facing downwards, towards the bottom of the hole. Once the housing 10 is installed in its operational position, the soil surrounding the housing is tamped down and compacted.

The reservoir 24 is installed in its operational position by inserting it via the receiving opening 16 into the housing cavity 14, until the reservoir flange 32 rests on top of the housing flange 22. Once the reservoir 24 has been installed, there is a hollow, annular space between the cylinder wall 40 of the reservoir and the outer wall 12 of the housing and the spacing of the hollow annular space is maintained by the ribs 20.

A nozzle 50 with a correctly sized bore 56 and the standpipe 58, are fitted on the apertures 34,36 with the standpipe extending upwards and a water supply tube (e.g. a light tributary line) is fitted on the spigot 54 of the nozzle. The assembled housing 10, reservoir 24, nozzle 50 and standpipe 58 are collectively referred to as a dispenser or dispensing device.

In other embodiments of the invention, a nozzle could be fitted to the second aperture 36 and the standpipe 58 could be connected via this nozzle to the top of the reservoir via a section of tube allowing for the standpipe to be placed at a different location if desired and at almost any height above the ground, if required.

The top of the dispenser can be left open at ground level, or could be covered with a light layer of soil or with any other material, if desired—e.g. to protect it against UV radiation. However, it is highly preferable that the upper opening 62 of the standpipe 58 should be visible.

When water is supplied to the nozzle 50, the flow of water to the dispensing device is restricted and controlled by the size of the bore 56 and the flow rate can be adjusted by replacing the nozzle with another nozzle with a different bore diameter. The water flows into the reservoir cavity 44 and from there flows out through the outlet openings 42 into the hollow annular space between the reservoir 24 and the outer wall 12 of the housing. From the annular space, the water drains under gravity out of the discharge opening 18 and into the soil. The discharge opening 18 is well below the surface of the soil and is preferably in the vicinity of the roots of a plant such as a tree or vine that is being targeted for irrigation.

The rate at which water drains from the reservoir cavity 44 into the soil, depends on the permeability of the soil, but if the outlet openings 42 are small, they could also restrict the rate at which the water is discharged.

The reservoir cavity 44 is vented to atmosphere via the standpipe 58, which also serves as vacuum breaker. In addition, in the event that the outlet openings 42 or the annular space between the reservoir 24 and the outer wall 12, becomes blocked, so that water cannot be dispensed underground quickly enough, the water accumulates in the reservoir cavity 44, rises in the standpipe 58, and spills from the visible upper opening 62 of the standpipe. This warning that the dispensing device is not functioning properly is thus easy to spot.

If a dispensing device is not operating properly, or if routine and/or preventative maintenance is required, the housing 10 can be left in situ, while the reservoir 24 is easily withdrawn by pulling it upwards from the housing. The ribs 20 have a minimal contact surface with the cylindrical wall 40 of the reservoir 24 to keep friction to a minimum while withdrawing the reservoir and any root growth, silting or other unwanted matter can be removed from the housing cavity 14 via the receiving opening 16. Similarly, the reservoir 24 can be cleaned and checked, before returning it to the housing cavity and returning the dispensing device to service.

In other embodiments of the invention, more than one reservoir could be provided inside a housing 10, or the reservoir 24 could be configured to have more than one reservoir cavity 44—each with its own water supply and potentially with different sized outlet openings 42. Such dispenser would allow users to dispense different quantities of water or other liquids (such as aqueous solutions or emulsions of pesticides or nutrients) selectively, simultaneously or sequentially, in independent dispensing systems within the same dispenser.

Referring to FIGS. 7 to 12, a second embodiment of irrigation apparatus according to the present invention is shown and is identified generally, by reference sign 70. Features that are similar between the second embodiment of the invention, shown in FIGS. 7 to 12 and the first embodiment of the invention, shown in FIGS. 1 to 6, are identified by the same reference signs. Features that are common between different embodiments of the invention can be presumed to serve the same purposes-unless the contrary is explicitly stated or is clear.

The irrigation apparatus 70 includes an elongate housing 10 with an outer wall 12 that defines a receiving opening 16 at its top and a discharge opening 18 at its bottom, with a housing cavity 14 between the receiving opening and discharge opening. At the top of the housing 10 an external screw thread 72 is provided onto which a housing stop formation in the form of a flange 22 can be attached, similar to the flange described above with reference to FIGS. 1 to 6. The housing 10 also includes housing stop formations in the form of circumferential barbs 74 that protrude from the outside of the outer wall 12 and that assist in preventing unwanted rotation of the housing in soil, or unwanted withdrawal of the housing from the soil.

The irrigation apparatus 70 includes a dispenser 76 comprising a hollow dispenser body 78 with a dispenser stop formation in the form of a lid 80 that is attached to the top of the dispenser body with screw thread 82. The lid 80 includes a circumferentially extending flange that is larger than the receiving opening 16 of the housing and the lid thus prevents the dispenser 76 from falling into the hosing cavity 14. In this illustrated embodiment, the lid 80 is attachable to the flange 22 of the housing 10 with complementary formations 84 on the flange 22 and lid 80 that cooperate in bayonet fashion, to hold the dispenser 76 in its operational position with the body 78 inside the housing cavity 14 at the receiving opening 16.

At the top of the lid 80, there is a central inlet opening 86 onto which an inlet fitting 88 is fitted with screw thread. The inlet fitting 88 includes a T-shaped pipe fitting with opposing ends that are attachable, in use, to a water supply conduit such as a tributary water supply line and a vent, and with a downward leg that defines an inlet passage that is in flow communication with the tributary water supply line and the vent, via the T-shaped pipe fitting and that is in communication with an internal cavity 90 inside the dispenser body 78.

The dispenser body 78 defines a plurality of outlet openings at the bottom of the cavity 90 that are in open to the housing cavity 14. The dispenser body 78 further defines several spreader elements in the form of fins 92 that each comprise of a wall in the flow path of water flowing from the outlet openings to the housing cavity. Water that enters the cavity 90 inside the dispenser body 78 flows under gravity through the outlet openings and adhere to the fins 92 before dripping into the housing cavity 14. The fins are preferably spaced far above the discharge opening 18 of the housing and serve to spread the flow of water from the dispenser 76 into the cavity 14.

Water from the inlet fitting 88 could be allowed to flow into the housing cavity 14 without obstruction, i.e. the cavity 90 of the dispenser body could be open to the housing cavity, but the dispenser cavity 90, outlet openings and fins 92 break the velocity of the water flow, reduce pressure and distribute the flow, to provide a gentle, slow, low pressure flow of water to the soil at the discharge opening 18. In other embodiments of the invention, other configurations of dispensers could be used, that receive water from a supply conduit and dispenses it into the housing cavity 14—preferably also in steady, low pressure flow.

Figure 11:
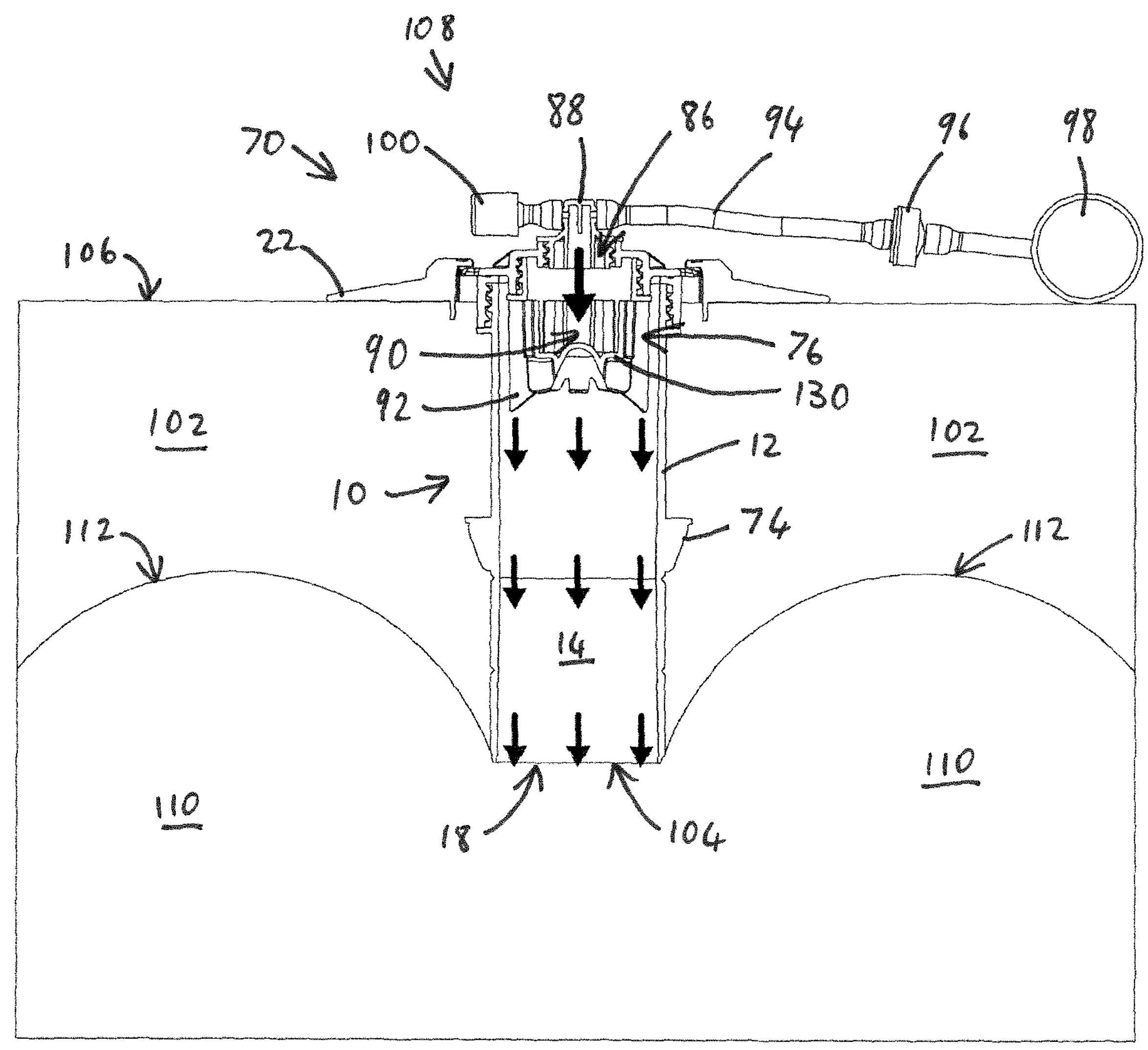
FIG. 11 shows a diagrammatic side view of an irrigation installation comprising the irrigation apparatus of FIG. 10, in use in soil.

Referring to FIG. 11, in this illustrated embodiment of the invention, the irrigation apparatus 70 is connected to a main water line 98 by the tributary water supply line 94 and the flow of water supplied to the dispenser 76 from the tributary water supply line is regulated by an in-line drip emitter 96. However, in other embodiments of the invention other flow regulators such as nozzles or flow restrictions may be used that are in flow communication with the inlet opening 86 of the dispenser 76. The drip emitter 96 or other flow restriction may also be provided inside the dispenser 76 and may be below the inlet opening 86—as long as it is configured to control the flow rate of water that flows through the dispenser.

On the leg of the inlet fitting 88 that is opposite from the tributary water line 94, an insect resistant vent 100 is provided, which also serves as vacuum breaker.

The housing 10 is installed in a cylindrical hole in soil 102, so that the internal cavity 14 is open to an exposed soil surface 104 at the discharge opening 18. The exposed soil surface 104 is well below ground level 106 by a depth that is determined by the length of the housing. The housing 10 can be cut by conventional means to a preferred length, to suit operational requirements—e.g. by using a longer length of housing in circumstances where water is required deeper below ground level 106. The flange 22 preferably rests on the soil 102 at ground level, to ensure correct positioning of the housing 10, although the flange can be covered with some soil, if desired.

Water is supplied to the irrigation installation 108 shown in FIG. 11 from the main water line 98 via the tributary water supply line 94 and in the dispenser 76, water exits the outlet openings of the dispenser under gravity and is spread by the fins 92 to drip under gravity into the cavity 14 in the form of spread our drops. The dripping water is represented by arrows in FIG. 11. The dripping water drops to the exposed soil surface 104 from where it is absorbed by the soil and a typical wetting profile is shown in FIG. 11, with wet soil 110 below a water table 112 that extends well below ground level 106.

The outlet openings of the dispenser 76 are not shown in the drawings, but a typical position of such an opening is shown in FIG. 11 with reference sign 130, in a bottom wall of the cavity 90, at the top of the fins 92.

Figure 12:
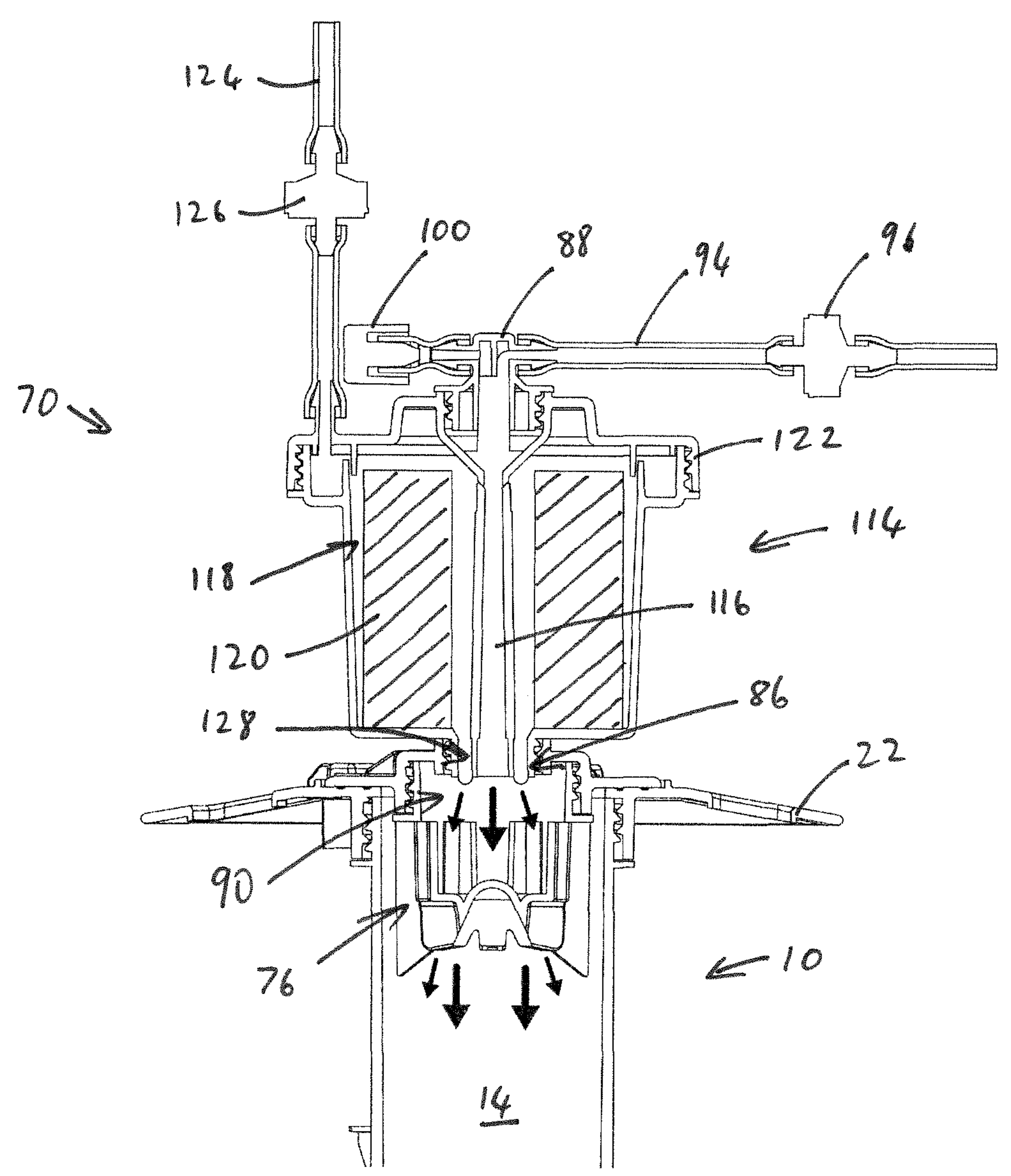
FIG. 12 shows a diagrammatic side view of the irrigation apparatus of FIG. 10 with a supplement dispenser.

Referring to FIG. 12, the irrigation apparatus 70 is shown, fitted with an additive dispenser 114. The additive dispenser 114 includes a threaded female fitting in which the inlet fitting 88 is fitted and it includes a threaded male fitting that is fitted into the inlet opening 86 of the dispenser 76, with a central passage 116 through which water simply flows downwards as described above. However, around the central passage 116, the additive dispenser 114 provides an annular chamber 118 in which a dissolvable stock 120 of additive is placed. The stock 120 can contain nutrients, supplements, pesticides, or the like and can be replenished by removing a lid 122 of the additive dispenser 114.

Water is supplied to the additive dispenser 114 via a separate tributary water supply line 124 with an in-line drip emitter 126 that controls water flow rate- and thus also the rate at which additives are dispensed. The water from the drip emitter 126 enters the chamber 118 to dissolve some of the stock 120 and the water with dissolved additives flows from the chamber via a dosing channel 128 through the inlet opening 86 and into the cavity 90 of the dispenser 76, where it is mixed with water from the inlet fitting 88 to be dispensed. The rate at which the additive is dispensed is thus controlled by the selection of flow emitter 126 and it determined separately for each irrigation installation- and thus typically for each tree or vine and it is independent from the rate at which clear water is supplied.

Other configurations of additive dispensers can be used with the irrigation apparatus 70, dispending additives into the water that is discharged to the soil.

The irrigation apparatus described herein above hold several advantages, of which some have already been mentioned, but the advantages further include, without limitation:

- The irrigation apparatus is suited to general agriculture where trees and or vines are about to be planted or are in existence and mature.
- The irrigation apparatus is ideally suited to the use of waste or used plastics in its construction.
- It is envisaged that the housings and dispensers will in the main be injection moulded at low cost.
- It is envisaged that reconstituted materials such as HDPE, PP or PET will be ideally suited to the production of the housings and dispensers.
- Depending on soil and other conditions, it is estimated that water saving due to the use of the irrigation apparatus could be as high as 50%.
- The ability to save a high percentage of water will enable farmers to plant trees and vines on land that otherwise might remain fallow due to limited water availability.
- The irrigation apparatus is environmentally advantageous as the materials used can be UV protected, long lasting, 100% recycled and 100% recyclable.
- The irrigation apparatus can be removed for maintenance without disturbing the trees etc.
- Where any number of dispensers have been attached to a main supply line it is possible to see clearly which specific dispenser is not able to supply water to a tree or vine in question—this dispenser can be removed for maintenance and either replaced or rectified and reattached or installed.
- If one dispenser is blocked this does not affect the ability of the watering "system" to continue feeding the rest of the dispensers as normal.
- Any dispenser attached to a main line watering system can be easily removed for maintenance or even uprated to increase or decrease the volume of water flowing to that dispenser attached to the main water delivery line, to accommodate the needs of any tree or vine.
- The irrigation apparatus can use one or more surface mounted main water feeder lines to feed any number of dispensers per line.
- Any number of light tributary lines connecting the dispensers to the main water feeder lines can be accommodated.
- Dispensers can be added or removed from the main water line at any time to accommodate new plantings or removal of trees or vines.
- The nozzle can be changed for a larger or smaller aperture at any time.
- The dispenser itself can be removed and changed for one with an increased volume and/or greater depth.
- The dispenser can be changed or increased in size and volume as the trees or vines mature.
- More than one dispenser can be used per tree or vine at inception or dispensers can be added at any time.
- A variety of different sized dispensers offering different volume deliveries can be installed on one main feeder line so as to accommodate trees or vines of differing sizes. • The irrigation apparatus is ideally suited to the delivery of a variety of liquid additives such as products that inhibit and control sub-surface pests, e.g. cut worms.
- The irrigation apparatus is ideally suited to the delivery of costly liquefied growth enhancing products—as this is delivered to the root system there is no wastage and close control can be achieved for maximum return on investment.
- The irrigation apparatus is easily installed,
- Each tributary line can feed multiple dispensers and the multiple dispensers could each irrigate multiple trees or vines or could irrigate a single plant, e.g. by forming a circle or semi-circle around one tree of vine.
- The drip emitter that is attached to the tributary line has a specific aperture (bore size) and the nozzle can be removed and changed so as to alter the specific volume of water being delivered to each or any specific tree or vine, it is therefore possible to specifically control the delivery or water, growth nutrients and pest control substances to each individual tree or vine.
- The dispenser may have a removable lid or a fixed lid—e.g. in the form of the housing flange.
- The dispenser may have more than one means of accepting water or other advantageous substances—e.g. more than one inlet openings of the dispenser, or more than one protruding fixture (such as the standpipe or additive dispenser).
- The reservoir 24 may have a fixed bottom 30 or a removable, exchangeable bottom, so as to allow for any suitable length of reservoir to be added or removed and altered in length or installed.
- The dispenser can be of any suitable width and or length.

Currently there are no other sub-surface soil irrigation means that deliver specific volumes of water and/or specific volumes of advantageous substances to specific trees or vines that are not electronically controlled. The irrigation apparatus of the present invention can accommodate any number of trees via any number of main water supply lines.

In appropriate circumstances, it might also be possible to feed larger dispensers directly via a main supply line.

The invention claimed is:

1. An irrigation apparatus comprising:

an elongate housing comprising an outer wall defining a receiving opening, a discharge opening and an elongate housing cavity that extends between the receiving opening and the discharge opening; and a dispenser that is attachable to the housing at the receiving opening, said dispenser being shaped and dimensioned to fit almost entirely within the housing cavity, and said dispenser defining an inlet opening that is configured to receive water from a water supply conduit and an outlet opening that is in communication with the inlet opening and with the housing cavity, said outlet opening being spaced from the discharge opening of the housing when the dispenser is attached to the housing at the receiving opening; and wherein the dispenser includes at least one spreader element disposed at the outlet opening, said at least one spreader element includes a plurality of fins, each with a free end, and circumferentially protruding from the outlet opening into the housing cavity along a flow path of water, each of said fins being spaced away from the outer wall of the housing to spread water discharged from the outlet opening as said water flows into the housing cavity.

2. The irrigation apparatus according to claim 1, which includes a drip emitter that forms a flow restriction in flow communication between the water supply conduit and the inlet opening of the dispenser.

3. The irrigation apparatus according to claim 1, in which the housing includes at least one housing stop formation that protrudes outwardly from the outer wall of the housing and is oriented in a direction transverse to the elongation of the housing.

4. The irrigation apparatus according to claim 3, wherein the housing stop formation is a circumferential housing flange.

5. The irrigation apparatus according to claim 1, in which the dispenser includes a dispenser stop formation that is shaped and configured to engage the housing in the vicinity of the receiving opening, to hold the dispenser in an operational position, and to prevent the dispenser from entering the housing cavity beyond a predetermined depth.

6. The irrigation apparatus according to claim 5, in which the dispenser stop formation is a circumferential dispenser flange that is larger than the receiving opening of the housing.

7. The irrigation apparatus according to claim 1, which includes an additive dispenser with an internal chamber for housing dissolvable stock, said chamber being in flow communication between the inlet opening of the dispenser and a water supply conduit that is separate from the water supply conduit to which the dispenser is connected.

8. The irrigation apparatus according to claim 1, wherein the dispenser includes an external wall that is at least partly permeable and that surrounds a reservoir cavity at least in part, said permeable wall defining a plurality of the outlet openings.

9. The irrigation apparatus according to claim 8, which includes at least one spacer that extends from the outer wall of the housing and towards the external wall of the reservoir.

10. An irrigation installation comprising the irrigation apparatus according to claim 1, wherein the housing is disposed in soil with the receiving opening facing upwards and the discharge opening facing downwards, with the dispenser disposed at least partly inside the housing cavity.

11. The irrigation apparatus according to claim 1, in which the housing includes at least one housing stop formation wherein the housing stop formation is a circumferential barb that protrudes outward from outside of the housing.

12. The irrigation apparatus according to claim 7, further comprising an in-line drip emitter in the water supply conduit that is configured to control a flow of water to the additive dispenser.

* * * * *